J. R. HENDERSON.
PROCESS OF PRESERVING FRESH FISH.
APPLICATION FILED NOV. 25, 1911.
1,055,636.
Patented Mar. 11, 1913.
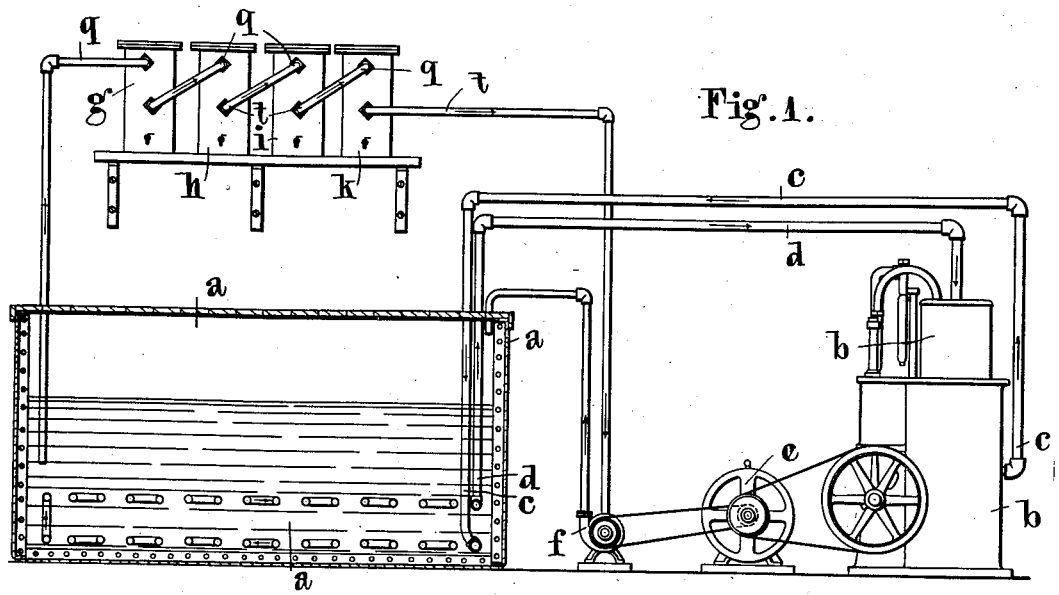
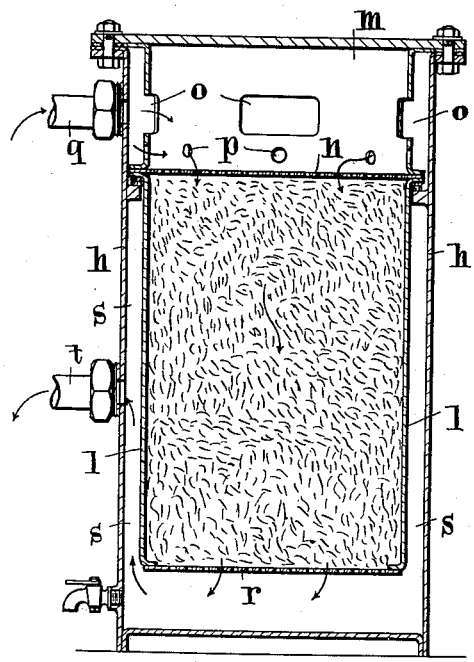
Witnesses:
L. B. Aveilhé
C. A. Davies
Inventor:
Jonathan R. Henderson
by Burch, Baker Smith
attys

UNITED STATES PATENT OFFICE.

JONATHAN RANKIN HENDERSON, OF LONDON, ENGLAND.

PROCESS OF PRESERVING FRESH FISH.

1,055,636.  Specification of Letters Patent.  Patented Mar. 11, 1913.

Application filed November 25, 1911. Serial No. 662,481.

*To all whom it may concern:*

Be it known that I, JONATHAN RANKIN HENDERSON, a subject of the King of Great Britain and Ireland, and residing at 5 Exchange Parade, Southwark street, in the county of London, England, have invented certain new and useful Improvements in or Relating to Processes for Preserving Fresh Fish, of which the following is a specification.

This invention relates to the treatment of fresh fish, and has for its object to devise a process which, when the fish have been treated thereby will prevent decomposition of the fish for several days without, however, destroying the natural flavor of the fish so treated, the process employed according to this invention being independent of the use of ice.

The process which is the subject of the present invention consists principally in first gradually cooling the fish, and subsequently subjecting them to a further treatment by means of sea water, also cooled, and to which common salt is added.

The invention further comprises various details hereinafter more particularly referred to.

In the accompanying drawings, Figure 1 represents diagrammatically one convenient form of apparatus which may be used for carrying out the process according to this invention, while Fig. 2 is a sectional elevation illustrating a detail.

In carrying the invention into effect in one convenient manner the fish, having if desired, been first gutted and cleaned are placed in trays or other receptacles in a cool chamber kept at a temperature of about 35° F. and in which the fish are allowed to remain for one or more hours, as necessary in order that their latent heat may be gradually abstracted. It is to be noted that this preliminary cooling is necessary prior to the further cooling hereinafter referred to, since rapid cooling to a temperature below 32° causes hardening of the outside tissues, thus, in a measure, forming an insulated surface to the flesh so that the bones retain their latent heat, and when the flesh is exposed to increased temperature this latent heat induces organic changes causing disintegration of tissues and molecular separation with consequent decomposition.

The fish having been cooled as described above are subjected to a further treatment for which one convenient form of apparatus is illustrated in the drawings. The cooled fish are placed in a vat or tank *a* which may be conveniently termed the treatment tank, and which contains sea-water to which has been added about 15 per cent. of common salt. During the treatment of the fish in the tank *a* the sea-water therein is kept cooled, preferably at a temperature of about 15° F., by means of a refrigerator *b* of any convenient known type connected to the tank by means of the pipes *c d* and which may be actuated by a motor *e* or any other convenient form of prime mover. During the treatment of the fish in the tank *a* the water is kept thoroughly circulated either by gravity or by means of a pump *f* or other suitable means, and with the percentage of salt above mentioned the circulating water is prevented from freezing at the temperature of 15° F. at which it is kept. At the same time the intense cold also prevents undue saline impregnation of the flesh while the salt-water forms, as it were, a protecting antiseptic film on the outside of the fish.

In order to keep the sea-water in the tank *a* in fit condition for the treatment of the fish it is passed through a filtering apparatus which in the preferred form consists of four chambers *g h i* and *k*. The chamber *g* is charged with crushed coke which arrests a large proportion of the slime and foreign matter which is present in suspension in the solution while the chamber *h* is packed with granulated animal charcoal which acts as a deodorizing and filtering agent. The third chamber *i* is filled with granulated wood charcoal, preferably willow charcoal, which is valuable as an absorbent of gases and noxious effluvia. The last chamber *k* contains diatomite or infusorial earth in a finely granulated form for the purpose of assisting in the sterilization and more complete filtration of the water, while the entire process imparts to the solution germ-destroying and gas-absorbing properties.

Fig. 2 shows in sectional elevation one convenient construction for the filtering chamber in which is arranged an inner chamber *l* containing the filtering medium and adapted to be removed bodily from the filter when it is required to renew the medium. A chamber *m* is separated from the compartment *l* by means of a perforated plate *n* and is provided with one or more perforations or apertures *o* and *p* in its walls through which the solution, entering by the pipe *q* passes and thence through the perforated plate *n* and the filtering medium. Having passed through the filtering medium the purified treating liquid emerges through the perforated plate *r*, and rising in the annular space or chamber *s* passes out through the outlet pipe *t* either into the next successive filtering compartment or back to the pump. The treating liquid is circulated in the manner above described for a period of three hours or longer according to climatic conditions when the fish may be removed from the treatment tank *a* and are then ready for market.

It is to be understood that the filter above described and the ingredients packed therein are only given as convenient examples, and any suitable form of filter may be adopted in place of that described while the ingredients which have been mentioned in detail may be replaced by any other effective filtering media.

Having now particularly described and ascertained the nature of my said invention and in what manner the same is to be performed I declare that what I claim is:—

1. A process for preserving fresh fish which consists in first cooling the fish and subsequently subjecting them to a further treatment by means of sea-water to which common salt is added and which is cooled to a temperature just above the freezing point of the salt solution.

2. A process for preserving fresh fish which consists in first cooling the fish in a chamber at a temperature of about 35 degrees Fah. and subsequently treating them with circulating sea-water to which about 15 per cent. of common salt is added and which is kept at a temperature of about 15° F.

3. A process for preserving fresh fish which consists in first gradually cooling the fish and subsequently subjecting them to a further treatment by means of circulating sea-water to which common salt is added and which is cooled to a temperature just above the freezing point of the salt solution and subsequently purifying the treating solution for further treatment of the fish.

In testimony whereof I have signed my name to this specification in the presence of two subscribing witnesses.

JONATHAN RANKIN HENDERSON.

Witnesses:
BERTRAM H. MATTHEWS,
E. C. WALKER.